US011799090B2

United States Patent
Lee et al.

(10) Patent No.: US 11,799,090 B2
(45) Date of Patent: Oct. 24, 2023

(54) GAS DIFFUSION LAYER COMPRISING MICROPOROUS LAYER INCLUDING CARBON HAVING PARTIALLY GRAPHITIZED STRUCTURE AND RADICAL SCAVENGER ADDITIVE, AND FUEL CELL EMPLOYING THE SAME

(71) Applicant: JNTG Co., LTD., Hwaseong-si (KR)

(72) Inventors: Eun Sook Lee, Suwon-si (KR); Jy Young Jyoung, Suwon-si (KR); Na Hee Kang, Osan-si (KR); Eun Chong Kim, Osan-si Gyeonggi-do (KR); Jong Sik Ryu, Gyeonggi-do (KR); Ki Cheol Ahn, Hwaseong-si (KR); Jae Young Choi, Hwaseong-si (KR)

(73) Assignee: JNTG Co., LTD.

(*) Notice: Subject to any disclaimer, the term of this patent is extended or adjusted under 35 U.S.C. 154(b) by 0 days.

(21) Appl. No.: 17/564,481

(22) Filed: Dec. 29, 2021

(65) Prior Publication Data

US 2022/0231304 A1 Jul. 21, 2022

(30) Foreign Application Priority Data

Jan. 21, 2021 (KR) .................. 10-2021-0008787

(51) Int. Cl.
*H01M 4/88* (2006.01)
*H01M 4/86* (2006.01)
(Continued)

(52) U.S. Cl.
CPC ....... *H01M 4/8807* (2013.01); *H01M 4/8657* (2013.01); *H01M 8/0234* (2013.01); *H01M 8/0245* (2013.01); *H01M 8/1004* (2013.01)

(58) Field of Classification Search
CPC ....... H01M 2008/1095; H01M 4/8657; H01M 4/8807; H01M 4/8821; H01M 8/0234; H01M 8/0245; H01M 8/1004; Y02E 60/50
See application file for complete search history.

(56) References Cited

U.S. PATENT DOCUMENTS

| 2010/0148111 A1* | 6/2010 | Fuertes Miquel | C01F 17/30 502/200 |
| 2012/0141919 A1 | 6/2012 | Lee | |

FOREIGN PATENT DOCUMENTS

| EP | 3968421 A1 * | 3/2022 | .......... H01M 4/8663 |
| JP | 2007213851 A | 8/2007 | |

(Continued)

OTHER PUBLICATIONS

Machine translation JP6700822B2 (Year: 2020).*
European Search Report for Application No. EP 21218082.2 dated Jun. 20, 2022.

*Primary Examiner* — Victoria H Lynch
(74) *Attorney, Agent, or Firm* — ST. ONGE STEWARD JOHNSTON AND REENS

(57) ABSTRACT

Provided a gas diffusion layer for fuel cells, the gas diffusion layer including: a carbon substrate; and a microporous layer formed on the carbon substrate, wherein the microporous layer comprises first carbon particles having a partially graphitized structure and a water-repellent binder resin binding the first carbon particles, and the microporous layer further comprises a cerium compound, a nitrogen-doped cerium compound, nitrogen-doped second carbon particles having a partially graphitized or non-graphitized structure, or a mixture of two or more, as a radical scavenger capable of removing hydrogen peroxide generated at a fuel cell open circuit potential or a higher potential. In the membrane electrode assembly and the fuel cell each employing the gas (Continued)

diffusion layer having excellent durability according to one or more embodiments, chemical or electrochemical degradation may be effectively prevented over a long period of time, and thus excellent electrochemical performance may be obtained over a long period of time. This leads to an extended lifetime of the fuel cell.

20 Claims, 7 Drawing Sheets

(51) Int. Cl.
  *H01M 8/0234* (2016.01)
  *H01M 8/0245* (2016.01)
  *H01M 8/1004* (2016.01)

(56) References Cited

FOREIGN PATENT DOCUMENTS

| | | | | |
|---|---|---|---|---|
| JP | 2012059586 | A | 3/2012 | |
| JP | 2019125429 | A | 7/2019 | |
| JP | 6700822 | B2 * | 5/2020 | .............. H01M 4/86 |
| WO | 2020226449 | A1 | 11/2020 | |

* cited by examiner

GAS DIFFUSION LAYER COMPRISING MICROPOROUS LAYER INCLUDING CARBON HAVING PARTIALLY GRAPHITIZED STRUCTURE AND RADICAL SCAVENGER ADDITIVE, AND FUEL CELL EMPLOYING THE SAME

CROSS-REFERENCE TO RELATED APPLICATIONS

This application is based on and claims priority under 35 U.S.C. § 119 to Korean Patent Application No. 10-2021-0008787, filed on Jan. 21, 2021, in the Korean Intellectual Property Office, the disclosure of which is incorporated by reference herein in its entirety.

FIELD OF THE INVENTION

One or more embodiments relate to a gas diffusion layer including a microporous layer (hereinafter, may be referred to as "MPL"), an electrode for fuel cells including the same, a membrane electrode assembly (MEA) including the same, and a fuel cell including the same. More specifically, one or more embodiments relate to a gas diffusion layer including cerium oxide particles, nitrogen-doped cerium oxide particles, nitrogen-doped and partially graphite structured carbon particles, nitrogen-doped and non-graphitized structured carbon particles or a mixture thereof as a radical scavenger in a microporous layer including carbon particles having a partially graphitized structure (hereinafter, may be referred to as "partially graphitized structured carbon particles") as a main material for MPL in order to improve durability of MEA and stack of a fuel cell, a membrane electrode assembly for a fuel cell, and a fuel cell, for example, a hydrogen fuel cell.

The present disclosure relates to the outcome of a project (Project Number: R-0006475) carried out with the support of the regional new industry promotion project (Managing Agency: Korea Institute for Advancement of Technology) of the Ministry of Trade, Industry and Energy.

BACKGROUND OF THE INVENTION

Fuel cells are electrochemical devices which generate an electrical energy through electrochemical reaction of fuel and oxygen. Since fuel cells are not heat engines, they have a high efficiency equal to or higher than the Carnot limit efficiency and discharge only water vapor as a by-product. Fuel cells may be classified into polymer electrolyte (PEM) type fuel cells, phosphoric acid type fuel cells, molten carbonate type fuel cells, solid oxide type fuel cells, and aqueous alkali solution type fuel cells depending on the type of electrolyte used. In the fuel cells, operating temperature and materials of components vary depending on the electrolyte used.

A polymer electrolyte membrane fuel cell (hereinafter referred to as "PEMFC") has low operating temperature and high efficiency, has high current density and high output density, has short start-up time, and has a rapid response to load changes, as compared with other types of fuel cells. Therefore, PEMFC is evaluated as the most suitable fuel cell as a power source for transportation or vehicles.

In a polymer electrolyte membrane fuel cell, a catalyst layer containing catalyst particles is applied on both sides of a polymer electrolyte membrane, and a gas diffusion layer (GDL) is bonded on both sides of the catalyst layer. A gasket for suppressing gas leakage is bonded to the edge of the gas diffusion layer to form a membrane electrode assembly (MEA). On both sides of the membrane electrode assembly (MEA), the microporous layer of the gas diffusion layer is bonded to the catalyst layer, and the carbon substrate and bipolar plate of the gas diffusion layer are in close contact with each other. Here, the gas diffusion layer (GDL) is produced by coating a carbon substrate made of a porous carbon material, such as carbon cloth, carbon nonwoven fabric, and carbon paper, with a microporous layer (MPL). Water, which is one of the by-products in the PEMFC's energy conversion process, is an essential factor in order to maintain the high ionic conductivity of the polymer electrolyte membrane (PEM). Therefore, in most cases, reactant gases such as hydrogen and air are sufficiently humidified and then supplied.

In order to suppress climate change caused by global warming and environmental destruction due to the climate change, fields where fuel cells are applied are increasing. Accordingly, insufficient lifetime of fuel cells is gradually considered to be a problem. For example, conventionally, lifetime required for hydrogen fuel cells applied to passenger cars is about 5,000 hours, but lifetime required for hydrogen fuel cells applied to trucks and buses is more than 25,000 hours.

During the operation of a fuel cell, components of a membrane electrode assembly, for example, an electrolyte membrane in which hydrogen ions generated by an electrode reaction in a fuel electrode (specifically, a hydrogen electrode) migrate, catalyst particles, and supports of the catalyst particles are deteriorated to limit the long-term use of the fuel cell. Deteriorations of the electrolyte membrane may be classified into chemical or electrochemical deterioration and mechanical deterioration. When chemical or electrochemical deterioration occurs in an environment where an open circuit potential (OCV) or a potential due to fuel mixing is continuously maintained 1.2 V or more, oxygen radicals and hydrogen peroxide are produced in large quantities due to carbon corrosion and side reactions of the catalyst supports and the microporous layer. Such side reaction products may react with a polymer membrane to destroy a part of the structure of the polymer membrane, and thus the polymer membrane may deteriorate. The deterioration of the polymer membrane leads to an increase in resistance and a decrease in durability of the membrane electrode assembly. Further, pin holes occur in the polymer membrane, and thus fuel mixing occurs, resulting in a rapid decrease in stack performance and a rapid decrease in stack output.

SUMMARY OF THE INVENTION

One or more embodiments are to provide a gas diffusion layer for fuel cells with extended lifetime that may maintain fuel cell performance for a long time by delaying or suppressing deterioration of a microporous layer, catalyst supports, and an electrolyte membrane.

One or more embodiments are to provide a membrane electrode assembly including the diffusion layer for fuel cells to have improved cell performance.

One or more embodiments are to provide a fuel cell including the diffusion layer for fuel cells to have improved cell performance.

Additional aspects will be set forth in part in the description which follows and, in part, will be apparent from the description, or may be learned by practice of the presented embodiments of the disclosure.

According to one or more embodiments, there is provided a gas diffusion layer for fuel cells, the gas diffusion layer including:
a carbon substrate; and a microporous layer formed on the carbon substrate,
wherein the microporous layer comprises first carbon particles having a partially graphitized structure and a water-repellent binder resin binding the first carbon particles, and the microporous layer further comprises a cerium compound, a nitrogen-doped cerium compound, nitrogen-doped second carbon particles having a partially graphitized structure, nitrogen-doped second carbon particles having a non-graphitized structure, or a mixture of two or more, as a radical scavenger capable of removing hydrogen peroxide generated at a fuel cell open circuit potential or at a higher potential.

In an embodiment, the microporous layer may include 15 wt % to 45 wt % of the water-repellent binder resin and 55 w % to 85 w % of the first carbon particles having a partially graphitized structure, and the content of the radical scavenger in the microporous layer may be 2 wt % to 30 wt % based on a total weight of the microporous layer.

In an embodiment, the cerium compound may include nano-sized Ce oxide particles, and/or the nitrogen-doped cerium compound may include nano-sized nitrogen-doped Ce oxide particles, and
in the second carbon particles having a partially graphitized structure, the carbon atom in the graphene planar structure of the second carbon particle is bonded to a nitrogen-containing functional group. Alternatively, the second carbon particle may have a non-graphitized structure and exist in a form in which a carbon atom, and a nitrogen atom in a nitrogen-containing functional group are bonded.

In an embodiment, the Ce oxide particles and/or the nitrogen-doped Ce oxide particles may include both $Ce^{3+}$ ions and $Ce^{4+}$ ions.

In an embodiment, a molar ratio of $Ce^{3+}$ ions to $Ce^{4+}$ ions in the Ce oxide particles and/or the nitrogen-doped Ce oxide particles may be in a range of 0.2:0.8 to 0.5:0.5, and in this case, the molar ratio may be calculated from an area ratio of characteristic peaks appearing in binding energy (unit: eV) each representing the state of $Ce^{3+}$ and $Ce^{4+}$ in an X-ray photoelectron spectroscopy spectrum.

In an embodiment, the Ce oxide particles and/or the nitrogen-doped Ce oxide particles may have an average size of 20 nm to 70 nm and an average specific area of 20 $m^2/g$ to 220 $m^2/g$.

In an embodiment, the nitrogen-doped Ce oxide particles may exist in the form of some of oxygen sites of the Ce oxide being substituted with a nitrogen atom and may have a nitrogen doping amount of 2 atomic % to 15 atomic %, and the second carbon particles may have a nitrogen doping amount of 0.5 atomic % to 5 atomic %.

In an embodiment, the nitrogen may be present in a form including a Ce—N bond on the surface of the Ce oxide particles or the nano-sized Ce oxide particles.

In an embodiment, the nitrogen-doped Ce oxide may be obtained in the form of Ce nitrogen oxide by reacting a mixture at a high temperature of 300° C. to 1000° C. under an inert atmosphere, the mixture being obtained by mixing Ce oxide and a precursor which is a nitrogen atom-containing compound.

In an embodiment, the water-repellent binder resin may be a fluorinated resin.

In an embodiment, the first and second carbon particles may be derived from any one selected from carbon black, active carbon, acetylene black, ketjen black, denka black, carbon whiskers, active carbon fibers, vapor grown carbon fibers (VGCFs), carbon aerosol, carbon nanotubes, carbon nanofibers, carbon nanohorns, and graphite, or a combination of two or more thereof, and the first and second carbon particles may be carbon particles that have been partially graphitized.

According to one or more embodiments, there is provided a membrane electrode assembly for fuel cells, including the above-described gas diffusion layer.

According to one or more embodiments, there is provided a fuel cell including the membrane electrode assembly.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION OF THE INVENTION

Figure 1:
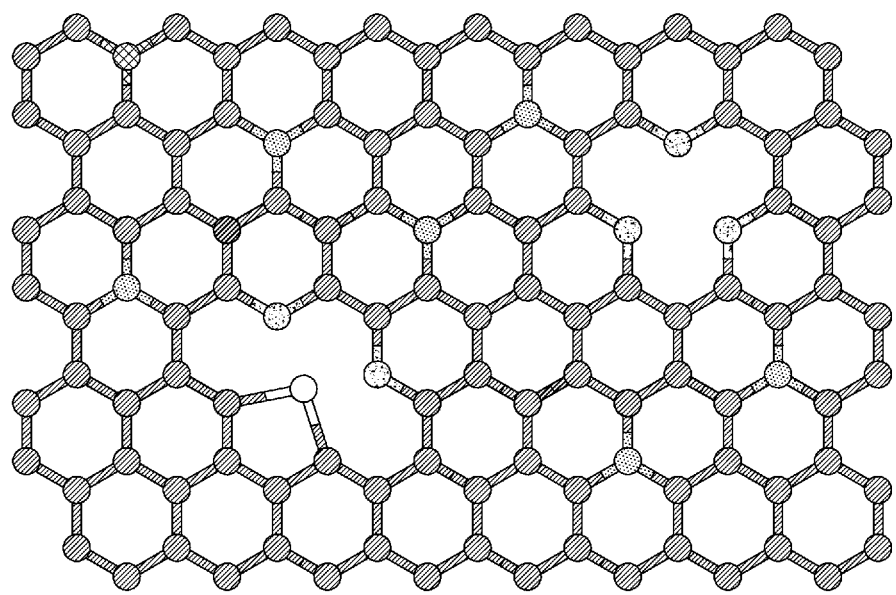
FIG. 1 is a schematic view illustrating various graphitic, pyridinic and pyrrolic nitrogen functional groups introduced into nitrogen-doped carbon particles having a partially graphitized structure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, a gas diffusion layer including a microporous layer, an electrode for fuel cells, a membrane electrode assembly (MEA), and a fuel cell according to one or more embodiments will be described in more detail with reference to the accompanying drawings. However, the following descriptions are only for illustrative purposes. Therefore, it is obvious to those skilled in the art that they may be variously modified and changed.

A gas diffusion layer for fuel cells according to an embodiment includes a carbon substrate, and a microporous layer (MPL) formed on the carbon substrate. The microporous layer includes first carbon particles having a partially graphitized structure, and a binder resin binding the first carbon particles, for example, a water-repellent binder resin. The microporous layer includes a first surface bonded to the carbon substrate, and a second surface opposite the first surface. In a membrane electrode assembly (MEA), a catalyst layer is formed on the microporous layer. The lower portion of the carbon substrate is in contact with a gas flow path. The second surface may face the catalyst layer, and the first surface may face a bipolar plate.

In the gas diffusion layer, the thickness of the microporous layer is not particularly limited, but may be 20 μm to 200 μm, for example, 20 μm to 150 μm, 30 μm to 100 μm, 30 μm to 80 μm, 30 μm to 70 μm, 30 μm to 60 μm, or 20 μm to 50 μm. In the gas diffusion layer, the average thickness of the carbon substrate is not particularly limited, but may be 20 μm to 1000 μm, for example, 30 μm to 600 μm, 50 μm to 500 μm, 100 μm to 450 μm, 100 μm to 400 μm, 100 μm to 300 μm, or 100 μm to 280 μm.

The gas diffusion layer may include a main body layer of the microporous layer including the second surface, a portion of the microporous layer at the side of the first surface penetrated into the carbon substrate, and the carbon substrate thereunder, from the top to bottom of the microporous layer along the thickness direction of the microporous layer. The microporous layer may include through passages formed of micropores extending from the first surface to the second surface or from the second surface to the first surface. Water and air or gases such as hydrogen produced from an electrochemical reaction may flow through the through passages.

The microporous layer may include a water-repellent binder resin in an amount of 15 wt % to 45 wt %, for example, 15 wt % to 40 wt %, 15 wt % to 35 wt %, 15.5 wt % to 34.5 wt %, 16 wt % to 34 wt %, 16.5 wt % to 33.5 wt %, 17 wt % to 33 wt %, or 18 wt % to 32 wt %; and first carbon particles having a partially graphitized structure in an amount of 55 wt % to 85 wt %, 60 wt % to 85 wt %, 65 wt % to 85 wt %, for example, 65.5 wt % to 84.5 wt %, 66 wt % to 84 wt %, 66.5 wt % to 83.5 wt %, 67 wt % to 83 wt %, or 68 wt % to 82 wt %.

The microporous layer includes first carbon particles having a partially graphitized structure, and a water-repellent binder resin binding the first carbon particles. These components are main materials constituting the microporous layer. The first carbon particles included in the microporous layer may have a partially graphitized structure including a graphene layer. The microporous layer further includes a radical scavenger. The radical scavenger can effectively remove hydrogen peroxide produced by the recombination reaction of hydrogen radicals and oxygen radicals generated at a fuel cell open circuit potential or at a higher potential. The radical scavenger may include a cerium compound, a nitrogen-doped cerium compound, nitrogen-doped second carbon particles having a partially graphitized structure, nitrogen-doped second carbon particles having a non-graphitized structure, or a mixture of two or more. In particular, it is preferable to use a nitrogen-doped cerium compound, for example, a nitrogen-doped cerium oxide, and/or nitrogen-doped second carbon particles having a partially graphitized structure, nitrogen-doped second carbon particles having a non-graphitized structure, in terms of radical removing performance. Since the microporous layer includes a radical scavenger, not only durability of the gas diffusion layer, but also durability of the membrane electrode assembly and the fuel cell in which the gas diffusion layer is employed may be improved.

The content of the radical scavenger in the microporous layer is 2 wt % to 30 wt %, for example, 2.5 wt % to 27 wt % based on a total weight of the microporous layer. For example, the content of the radical scavenger may be 3 wt % to 25 wt %, 3 wt % to 20 wt %, 3.5 wt % to 15 wt %, 3 wt % to 12.5 wt %, 3 wt % to 10 wt %, 2.1 wt % to 9.9 wt %, 2.2 wt % to 9.8 wt %, 2.3 wt % to 9.7 wt %, 2.4 wt % to 9.6 wt %, 2.5 wt % to 9.5 wt %, 2.6 wt % to 9.4 wt %, 2.7 wt % to 9.3 wt %, 2.8 wt % to 9.2 wt %, 2.9 wt % to 9.1 wt %, 3 wt % to 9 wt %, 3.5 wt % to 8.5 wt %, 4 wt % to 8 wt %, 4.5 wt % to 7.5 wt %, 4.7 wt % to 7.3 wt %, 5 wt % to 6 wt %, 5 wt % to 5.5 wt %, or 5 wt %, based on the total weight of the water-repellent binder resin and the first carbon particles.

The cerium compound may include nano-sized Ce oxide particles, and/or the nitrogen-doped cerium compound may include nano-sized nitrogen-doped Ce oxide particles. Specifically, it is preferable in terms of improvement in durability of the gas diffusion layer and the MEA and fuel cell including the gas diffusion layer that the Ce oxide particles and/or the nitrogen-doped Ce oxide particles include both $Ce^{3+}$ ions and $Ce^{4+}$ ions. The molar ratio of $Ce^{3+}$ ions to $Ce^{4+}$ ions in the Ce oxide particles and/or the nitrogen-doped Ce oxide particles is in a range of 0.2:0.8 to 0.8:0.2, for example, 0.25:0.75 to 0.5:0.5, 0.3:0.7 to 0.5:0.5, or 0.35:0.65 to 0.5:0.5. The molar ratio is calculated from an area ratio of characteristic peaks appearing in binding energy (unit: eV) each representing the state of $Ce^{3+}$ and $Ce^{4+}$ in an X-ray photoelectron spectroscopy spectrum.

The Ce oxide particles and/or the nitrogen-doped Ce oxide particles may have an average size of 20 nm to 70 nm, for example, 20 nm to 60 nm or 20 nm to 50 nm, and an average specific area of 20 $m^2/g$ to 220 $m^2/g$, for example, 25 $m^2/g$ to 200 $m^2/g$, 30 $m^2/g$ to 180 $m^2/g$, or 40 $m^2/g$ to 160 $m^2/g$.

The nitrogen-doped Ce oxide may be present in the form of a Ce nitrogen oxide in which an oxygen site of the Ce oxide is substituted with a nitrogen atom. The nitrogen-doped porous Ce oxide may have a nitrogen doping amount of 2 atomic % to 15 atomic %, 3 atomic % to 14 atomic %, 4 atomic % to 13 atomic %, 5 atomic % to 12 atomic %, 6 atomic % to 11 atomic %, 7 atomic % to 10 atomic %, 7 atomic % to 9 atomic %, or 7 atomic % to 8 atomic %. The doped nitrogen may be present in the form including a Ce—N bond on the surface of the Ce oxide particles or the nano-sized Ce oxide particles in which the Ce—N bond is produced by some of oxygen sites on the surface of the Ce oxide or the nano-sized Ce oxide particles being substituted with nitrogen atoms.

The second carbon particles may have a nitrogen doping amount of 0.5 atomic % to 5 atomic %, 1 atomic % to 4 atomic %, or 1.5 atomic % to 3 atomic %.

The nitrogen doping amount of the nitrogen-doped porous Ce oxide and the second carbon particles is calculated from an area ratio of characteristic peaks of Ce—N and C—N appearing in binding energy of 882 eV and 920 eV, respectively, in an X-ray photoelectron spectroscopy spectrum.

The first carbon particles having a partially graphitized structure may be obtained through a graphitization heat treatment process of amorphous carbon particles at a temperature of more than 1,500° C., for example, 1,600° C. or more, 2,000° C. or more, 2,200° C. or more, or 2,400° C. or less under an inert gas atmosphere of nitrogen or argon gas. In the X-ray diffraction spectroscopy, in a pure graphite structure, a characteristic diffraction peak appears at a diffraction angle 2θ=26.7°, and an interplanar distance $d_{002}$ of a (002) plane in a hexagonal crystal structure is 3.354 Å. Accordingly, it may be said that the closer the interplanar distance $d_{002}$ of the (002) plane of the carbon particles is to 3.354 Å, the higher the degree of graphitization.

In the present disclosure, the first carbon particles, which are the main material of the microporous layer, may have a crystal structure similar to a pure graphite crystal structure by allowing the interplanar distance $d_{002}$ of the first carbon particles to be closer (for example, 3.36 Å to 3.55 Å) to 3.354 Å, which is an interplanar distance of a (002) plane of a graphite crystal structure, rather than 3.72 Å, which is an interplanar distance $d_{002}$ of non-graphitized carbon particles having an amorphous structure, through temperature control in graphitization heat treatment process.

The second carbon particles used as the radical scavenger are obtained by nitrogen-doping treatment of the first carbon particles. In the present disclosure, the structure of the first and second carbon particles exhibiting crystallographic characteristics similar to those of pure graphite may be referred to as a 'partially graphitized structure'. Specifically, the 'partially graphitized structure' may be defined that the Bragg diffraction angle (2θ) of the carbon particle is 25.2° to 26.4°, the interplanar distance $d_{002}$ of a (002) crystal plane is 3.55 Å or less, for example, 3.36 Å to 3.55 Å or 3.40 Å to 3.55 Å, and the thickness Lc of the (002) crystal plane is 15 Å to 200 Å, for example, specifically 20 Å to 150 Å, more specifically 50 Å to 120 Å. As the graphite crystal structure develops, the thickness of the (002) crystal plane Lc tends to increase as the graphitization temperature increases. Generally, the $d_{002}$ of graphite is 3.35 Å, and the Lc thereof is greater than 500 Å. In the present disclosure, not carbon particles having a pure graphite structure, but the first carbon particles having a partially graphitized structure may be used as the main material of the microporous layer, and the second carbon particles obtained by doping the first carbon particles with nitrogen may be used as the radical scavenger. When the carbon particles have a pure graphite structure, a nano-sized porous structure on the surface of the carbon particle becomes compact, so that porosity is lowered, and the sizes of particles increase due to the aggregation of the particles, with the result that the specific surface of the particle decreases, thereby deteriorating a water discharge function required for fuel cells. Accordingly, in the present disclosure, the first carbon particle having a partially graphitized structure rather than a pure graphite structure are used as the main material of the microporous layer, and the second carbon particles obtained by doping carbon particles having a partially graphitized structure or carbon particles having a non-graphitized structure with nitrogen may be used as the radical scavenger.

Meanwhile, the nitrogen-doped Ce oxide particles used as the radical scavenger may be present in the form of a composite obtained by annealing a uniform mixture of Ce oxide particles and a precursor of carbon nitrides which is a compound including a nitrogen atom and a carbon atom at a high temperature of 300° C. to 1,200° C., for example, 300° C. to 1000° C., for example, 320° C. to 900° C., 340° C. to 880° C., 360° C. to 860° C., 380° C. to 840° C., 400° C. to 820° C., 420° C. to 800° C., or 430° C. to 750° C. under an inert atmosphere. When the uniform mixture of the Ce oxide particles and the precursor are annealed at a high temperature under an inert atmosphere, carbon nitrides produced by thermal decomposition of the precursor compound may be doped on the surface of the porous Ce oxide. The carbon nitrides may form a Ce—N bond on the surface of the porous Ce oxide.

The precursor may be a carbon-based organic compound containing a nitrogen atom. Specifically, the carbon-based organic compound may be a single molecular compound or a polymer, and may be any one selected from ammonia gas, an aniline-based polymer, melamine, urea, a glucose-based derivative compound, and an amine-based compound, or a combination of two or more thereof.

The nitrogen-doped second carbon particles having a partially graphitized structure or non-graphitized structure, used as the radical scavenger, may be obtained in a form in which some of the carbon atoms in the graphene planar structure or non-graphitized structure of the second carbon particles and a nitrogen-containing functional group are bonded by reacting the uniform mixture of the first carbon particles having a partially graphitized or non-graphitized structure and the precursor at a high temperature of 300° C. to 1,200° C., for example, 400° C. to 1200° C., 500° C. to 1200° C., 600° C. to 1200° C., 600° C. to 1000° C., or 600° C. to 900° C. under an inert atmosphere.

The process of doping a nitrogen atom may be performed using various methods such as a pyrolysis process, a hydrothermal process, a plasma treatment process, and a microwave treatment process. The nitrogen-containing functional group may include a pyrrolic functional group, a pyridinic functional group, and/or a graphitic functional group. The nitrogen (N) atom of the pyridinic functional group is bonded to two carbon atoms of a hexagonal heterocyclic ring in each graphene plane included in a graphite structure, the nitrogen (N) atom of the pyrrolic functional group is bonded to two carbon atoms of a pentagonal heterocyclic ring in each graphene plane included in the graphite structure, and the nitrogen (N) atom of the graphitic functional group exists in a state of substituting the carbon atom in the graphene plane.

The nitrogen (N) atom of various graphitic, pyridinic and pyrrolic nitrogen functional groups in the nitrogen-doped carbon particles having a partially graphitized structure. Referring to FIG. 1, FIG. 1 illustrates one graphene plane present in a partially graphitized structure in the carbon particles. The graphene plane consists of hexagonal rings of 6 carbon atoms. In the graphene plane of this structure, the pyrrolic N atom, pyridinic N atom, and graphitic N atom of the nitrogen-containing functional group introduced by the above-described nitrogen doping may be seen.

The nitrogen atom doped to the second carbon particles used as the radical scavenger, that is, the nitrogen atom of the nitrogen-containing functional group may exert a function of a co-catalyst to promote reactivity in an oxygen reduction reaction by changing the Fermi level of the carbon atom having a partially graphitized structure to change the electrical characteristics of the surface of the carbon particles. Further, the nitrogen atom may act as a barrier to block the approach of side products such as hydrogen peroxide produced in a fuel cell to carbon, thereby suppressing the chemical or electrochemical corrosion of the microporous layer and catalyst support mainly made of carbon particles.

The carbon substrate may be carbon paper, carbon fibers, a carbon felt, or a carbon sheet, but is not limited thereto. The carbon substrate may have the above-described thickness and pores.

When the gas diffusion layer according to the present disclosure is formed by coating a carbon substrate with a composition for the microporous layer, specifically, the carbon substrate may be carbon paper, for example, commercially available under the product number JNT18, JNT21, JNT20, JNT30, or JNT40, manufactured by JNTG Corporation (Hwaseong City, Gyeonggi Province, Korea).

After impregnating the carbon substrate with a water-repellent polymer resin, this carbon substrate may be used to prepare a gas diffusion layer. When the carbon substrate is impregnated with a water-repellent polymer resin, the thickness of the water-repellent polymer resin may be 10 μm or less, for example, 1 μm to 5 μm, or 1 μm or less.

The first carbon particles used to form the microporous layer and the second carbon particles used as the radical scavenger are not particularly limited. The first and second carbon particles may include any one selected from carbon black, active carbon, acetylene black, ketjen black, denka black, carbon whiskers, active carbon fibers, vapor grown carbon fibers (VGCFs), carbon aerosol, carbon nanotubes, carbon nanofibers, carbon nanohorns, and graphite, or a combination of two or more thereof. The first carbon particles may be partially graphitized carbon particles. The second carbon particles may be carbon particles having a partially graphitized or non-graphitized structure. The carbon particles usable to obtain the first and second carbon particles through an annealing treatment may be commercially available carbon black under trade names, such as Vulcan XC-72 (Manufacturer: Cabot Corporation), Shawinigan Black Grade C55 (Manufacturer: Chevron Phillips Chemical Company), Furnace Black N762 or Furnace Black N550 (Manufacturer: Cancarb Corporation), and Lamp Black 101 (Orion Engineered Carbons).

The water-repellent binder resin is not particularly limited as long as it may be combined with a carbon material, such as carbon particles. The water-repellent binder resin may include a fluorinated resin having excellent thermal stability and water repellency, or may be made of a fluorinated resin having excellent thermal stability and water repellency. The fluorinated resin may be any one selected from polytetrafluoroethylene (PTFE), a tetrafluoroethylene-perfluoroalkyl vinyl ether copolymer, a fluorinated ethylene-propylene (FEP) copolymer, a tetrafluoroethylene-hexafluoropropylene copolymer, perfluoroalkoxy (PFA), a polychlorotrifluoroethylene, ethylene-tetrafluoroethylene (ETFE) copolymer, polyfluorovinylidene (PVDF), and a PVDF-based copolymer, or a combination thereof, but the present disclosure is not limited thereto.

The gas diffusion layer including the microporous layer according to an embodiment, having the above-described structure, may be manufactured using any suitable method known to those skilled in the art, such as a method of preparing a slurry composition for the microporous layer and applying the slurry composition on a substrate.

The composition for the microporous layer according to the present disclosure may be prepared by any suitable material and any method known to those skilled in the art. Therefore, the slurry composition for the microporous layer may include the above-described first carbon particles, a water-repellent binder resin, such as a fluorinated resin, and a radical scavenger selected from a cerium compound, a nitrogen-doped cerium compound, nitrogen-doped second carbon particles having a partially graphitized structure, nitrogen-doped second carbon particles having a non-graphitized structure, or a mixture of two or more thereof.

The slurry composition for the microporous layer may further include a dispersant and a solvent. The slurry composition for the microporous layer may be prepared by a method including introducing first carbon particles and radical scavenger particles into a solution including a dispersant to be impregnated with a solvent on the surfaces of the first carbon particles and the radical scavenger particles and milling or high-speed mixing the first carbon particles and the radical scavenger particles such that the components of the first carbon particles and the radical scavenger particles are finely and homogenously dispersed at a level of a nano-size or micro-size; and adding a fluorinated resin such as PTFE, as a water-repellent binder resin, to the mixture and mixing the mixture to homogenously dispersing the mixture.

The dispersant is not particularly limited as long as it may homogenously disperse materials such as first carbon particles and radical scavenger particles. The dispersant may be any one selected from a cationic surfactant, an anionic surfactant, a nonionic surfactant, and an amphoteric surfactant, or a combination of two or more thereof. Specifically, examples of the dispersant may include, but are not limited thereto, cationic surfactants, such as alkyl trimethyl ammonium salts, alkyl dimethyl benzyl ammonium salts, and phosphate amine salts; anionic surfactants, such as polyoxyalkylene alkyl ethers, polyoxyethylene derivatives, alkylamine oxides, and polyoxyalkylene glycols; amphoteric surfactants, such as alanine-based, imidazolium-betaine-based, amidopropylbetaine-based, and aminodipropionic acid salts; and nonionic surfactants such as alkylaryl polyether alcohols. The usable anionic surfactants may include anionic surfactants commercially available under the trademarks, such as HOSTAPAL or EMULSOGEN (manufacturer: Clariant Corporation), DISPERSBYK (manufacturer: BYK Corporation), and DISPERS (manufacturer: TEGO Corporation), and the usable nonionic surfactant may include those commercially available under the trademarks, such as Triton X-100 (manufacturer: Dow Chemical Company). The dispersant used may be a material that can be removed by thermal decomposition at a temperature of 250° C. to 400° C.

In the composition for the microporous layer according to the present disclosure, the amounts of the dispersant and the solvent in the composition may be changed depending on the type and specific surface area of the first carbon particles and the radical scavenger particles. For example, when the first carbon particles having a large specific surface area, such as ketjen black, is included in the composition, a large amount of the solvent may be adsorbed in micropores of ketjen black, and thus the first carbon particles may be difficult to disperse, so that a large amount of the dispersant may be needed. In contrast, when the first carbon particles having a small specific surface area, such as acetylene black, is included in the composition, relatively small amounts of the solvent and the dispersant may be used.

The composition for the microporous layer according to the present disclosure may include one type of solvent or two or more types of solvents. For example, as the solvent, basic solvents such as water, n-propanol, and isopropanol may be used alone or in a combination thereof. Alternatively, a solvent having a high boiling point such as ethylene glycol, glycerol, dimethylsulfoxide (DMSO), N-methyl-2-pyrrolidone (NMP), or butyl acetate may be further mixed with the above-described basic solvent and then used.

The method of coating the composition for the microporous layer may be performed by spray coating, doctor blade coating, comma coating, slot die coating, or the like, and any method may be used. The thickness of the microporous layer is not particularly limited, and the thickness thereof and the concentration of the fluorinated resin may be changed depending on the application and stack operation conditions.

After the composition for the microporous layer according to the present disclosure is prepared, the composition for the microporous layer is applied on the carbon substrate, dried and sintered to form the microporous layer according to the present disclosure. In this case, when the composition for the microporous layer is applied on the carbon substrate and dried, some portion of the MPL penetrates into the carbon substrate, and the other portion thereof may form a layer on the surface of the carbon substrate. The through passages of the MPL may be formed from the surface of the MPL to the MPL portion penetrated into the carbon substrate.

A fuel cell according to the present disclosure is not particularly limited as long as it includes the gas diffusion layer according to the present disclosure. Specifically, the fuel cell according to the present disclosure may include an anode, a cathode, and an electrolyte membrane. In this case, the anode and/or the cathode may include a gas diffusion layer, and this gas diffusion layer may be the gas diffusion layer according to the present disclosure.

The fuel cell according to the present disclosure may be, for example, a polymer electrolyte type fuel cell, a phosphoric acid type fuel cell, or an aqueous alkali solution type fuel cell, depending on a type of an electrolyte, but the type of the fuel cell is not particularly limited. According to an embodiment, the gas diffusion layer of the present disclosure is useful in manufacturing a hydrogen fuel cell for automobiles.

The fuel cell provided according to the present disclosure may be manufactured by any suitable method known to those skilled in the art, except that the fuel cell includes the gas diffusion layer according to the present disclosure.

As described above, in the gas diffusion layer according to the present disclosure, the microporous layer includes the first carbon particles having a partially graphitized structure as a main material, and further includes a radical scavenger additive capable of effectively removing hydrogen peroxide produced by a recombination reaction of oxygen and hydrogen radicals generated by fuel cell operation.

Accordingly, in the membrane electrode assembly and the fuel cell each employing the gas diffusion layer having excellent durability according to one or more embodiments, chemical or electrochemical degradation may be effectively prevented over a long period of time, and thus excellent electrochemical performance may be obtained over a long period of time. This leads to an extended lifetime of the fuel cell.

Since the gas diffusion layer of the present disclosure has excellent durability, the fuel cell employing this gas diffusion layer is useful in fuel cells for vehicles. Further, the gas diffusion layer according to the present disclosure may be applied not only in the fields of fuel cells but also in the fields of electrolyzers such as chlorine or fluorine electrolyzers and water electrolyzers, or energy storage devices using carbon materials such as electric double layer capacitors. Accordingly, electrolyzers or energy storage devices including the gas diffusion layer according to the present disclosure may exhibit stable cell performance over a long period of time.

Hereinafter, the present disclosure will be described in more detail using the following Examples, but these Examples are set forth only to illustrate the present disclosure, and the scope of the present disclosure is not limited thereto.

Preparation Example 1: Preparation of Carbon Particles Having a Partially Graphitized Structure Commercially available carbon black carbon particles (Manufacturer: Cabot Corporation, product name: Vulcan XC-72) were put into an electric furnace under an argon atmosphere, and were heated to 1,600° C. or more at a temperature increase rate of 5° C./min. When the heating temperature reaches a target graphitization treatment temperature, the commercially available carbon particles were subjected to graphitization treatment at this target temperature for 1 hour, and cooled to room temperature to obtain carbon particles having a partially graphitized structure. In this case, the commercially available carbon particles were subjected to a graphitization process at a temperature of 1,600° C., 2,000° C., 2,200° C., or 2,400° C. for 1 hour to obtain carbon particles having a partially graphitized structure. Specifically, carbon particles having a Bragg diffraction angle (2θ) of 25.2° to 26.4°, an interplanar distance $d_{002}$ of 3.40 Å to 3.44 Å, and a (002) crystal plane thickness Lc of 18 Å to 114 Å were obtained. In Table 1 below, the crystallographic structure characteristics of the carbon particles, measured by X-ray diffraction (XRD), according to the graphitization treatment temperature.

TABLE 1

| | Graphitization temperature, ° C. | | | | |
|---|---|---|---|---|---|
| | 1,600 | 2,000 | 2,200 | 2,400 | Untreated carbon raw material |
| Lc, Å | 30 | 71 | 100 | 114 | 7 |
| $d_{002}$, Å | 3.44 | 3.43 | 3.41 | 3.40 | 3.72 |

Preparation Example 2: Preparation of Cerium Oxide Particles with an Adjusted Ratio of $Ce^{3+}$ Ions to $Ce^{4+}$ Ions Commercially available $CeO_2$ particles having an average size of about 48 nm and a specific surface area of about 27.5 $m^2/g$ were put into an electric furnace, heated at a temperature increase rate of 5° C./min under a nitrogen atmosphere, and heat-treated at 700° C. for 1 hour. Thereafter, the commercially available $CeO_2$ particles were cooled to room temperature to obtain cerium oxide particles with an adjusted molar ratio of $Ce^{3+}$ ions to $Ce^{4+}$ ions=about 25:about 75.

Further, the commercially available $CeO_2$ particles were heat-treated at 550° C. for 1 hour in the same manner to obtain cerium oxide particles with an adjusted molar ratio of $Ce^{3+}$ ions to $Ce^{4+}$ ions=about 30:about 70. In this case, the molar ratio of Ce ions was measured through XPS analysis described below.

Preparation Example 3: Preparation of Nitrogen-Doped (N-Doped) Cerium Oxide Particles 10 g of commercially available $CeO_2$ particles having an average size of about 48 nm and a specific surface area of about 27.5 m²/g were mixed with 5 g of melamine (Sigma Aldrich) at this weight ratio, and were uniformly pulverized in a mortar. The mixture obtained in this way was put into a porcelain container, and this container was put into the center of a three-zone heating furnace having a tubular shape (outer diameter 70 mm, inner diameter 64 mm, and length 1,400 mm). The mixture was heated at a temperature increase rate of 5° C./min under a nitrogen atmosphere, and heat-treated at 550° C. for 1 hour. Thereafter, the resulting mixture was cooled to room temperature to obtain nitrogen-doped cerium oxide particles.

In this way, nitrogen-doped cerium oxide particles having a nitrogen doping amount of 7.2 atomic % (molar ratio of $Ce^{3+}$ ions to $Ce^{4+}$ ions=about 30:about 70) were obtained.

Preparation Example 4: Preparation of Nitrogen-Doped Carbon Particles Having Partially Graphitized Structure 10 g of the carbon particles having a partially graphitized structure, graphitized at 1,600° C. in Preparation Example 1, were mixed with 5 g of melamine (Sigma Aldrich) at this weight ratio, and were uniformly pulverized in a mortar. The mixture obtained in this way was put into a porcelain container, and this container was put into the center of a three-zone heating furnace having a tubular shape (outer diameter 70 mm, inner diameter 64 mm, and length 1,400 mm). The mixture was heated at a temperature increase rate of 5° C./min under a nitrogen atmosphere, heat-treated at 600° C. for 1 hour, and then cooled to room temperature to obtain carbon particles having a partially graphitized structure in which 1.5 atomic % of nitrogen is doped.

Example 1 (EX 1)

(i) Preparation of Composition for Microporous Layer 1,000 g of deionized water and 1 g of a nonionic dispersant (TritonX-100) were mixed in a mixing tank to prepare a solution. 76 g of the carbon black particles having a partially graphitized structure, graphitized at 1,600° C. in Preparation Example 1, were mixed with the solution. 40 g (PTFE solid content 24 g) of an emulsion (including PTFE in an amount of 60 wt %) of polytetrafluoroethylene (PTFE) as a fluorinated resin, and 5 wt % (based on a total weight of MPL solid content) of the cerium oxide particles with an adjusted molar ratio of $Ce^{3+}$ ions to $Ce^{4+}$ ions=about 25:about 75 obtained in Preparation Example 2 were further added to the mixture, and the mixture thus obtained was mechanically stirred to perform high-speed dispersion.

Thus obtained dispersion was put into a basket mill containing alumina balls having a size of about 2 mm, and was subjected to ball milling for 1 hour to finely disperse particles in the dispersion. A small amount of deionized water was added to the dispersion obtained in this way such that the content of PTFE is maintained at 30 wt %, and the dispersion was subjected to mixing to prepare a slurry composition for a microporous layer.

(ii) Preparation of Gas Diffusion Layer

The PTFE emulsion (PTFE content: 60 wt %) was diluted with deionized water such that the PTFE content was 5 wt %, and then a sheet of carbon paper (Manufacturer: JNTG Corporation, product name: JNT20) having a thickness of about 210 μm was impregnated with the PTFE emulsion, and the carbon paper was coated such that the impregnation amount of PTFE is about 10 wt % of the carbon paper. The resulting carbon paper was dried at room temperature to obtain a water-repellent carbon substrate coated with a fluorinated resin.

Subsequently, the slurry composition for a microporous layer obtained above was discharged at a constant pressure using a slot die coater to apply the slurry composition onto one surface of the water-repellent carbon substrate. Thereafter, the water-repellent carbon substrate was dried for about 20 minutes in a drying furnace having a temperature distribution of about 100° C. to about 130° C. This resulting product was sintered at 350° C. for about 20 minutes under an air atmosphere to obtain a gas diffusion layer (GDL) with a microporous layer (MPL) stacked on the water-repellent carbon substrate.

Example 2 (EX 2)

A gas diffusion layer (GDL) was prepared in the same manner as in Example 1, except that 5 wt % (based on a total weight of MPL solid content) of the cerium oxide particles (Preparation Example 2) with an adjusted molar ratio of $Ce^{3+}$ ions to $Ce^{4+}$ ions=about 30:about 70 was used instead of the cerium oxide particles with an adjusted molar ratio of $Ce^{3+}$ ions to $Ce^{4+}$ ions=about 25:about 75 in the process (i) of preparing the composition for a microporous layer.

Example 3 (EX 3)

A gas diffusion layer (GDL) was prepared in the same manner as in Example 1, except that 5 wt % (based on a total weight of MPL solid content) of the N-doped cerium oxide particles obtained in Preparation Example 3 (molar ratio of $Ce^{3+}$ ions to $Ce^{4+}$ ions=about 30:about 70, N doping amount of 7.2 atomic %) was used instead of the cerium oxide particles obtained in Preparation Example 2 (molar ratio of $Ce^{3+}$ ions to $Ce^{4+}$ ions=about 25:about 75) in the process (i) of preparing the composition for a microporous layer.

Example 4 (EX 4)

A gas diffusion layer (GDL) was prepared in the same manner as in Example 1, except that 75 g of the carbon black particles having a partially graphitized structure (Preparation Example 1) graphitized at 1,600° C., and 41.7 g (PTFE content 25 g) of the PTFE emulsion (PTFE content of 60 wt %) were used as main materials of MPL, and 10 wt % (based on a total weight of MPL solid content) of the nitrogen-doped carbon particles having a partially graphitized structure obtained in Preparation Example 4 (N doping amount of 1.5 atomic %) was used instead of the cerium oxide particles obtained in Preparation Example 2 (molar ratio of $Ce^{3+}$ ions to $Ce^{4+}$ ions=about 25:about 75) in the process (i) of preparing the composition for a microporous layer.

Example 5 (EX 5)

A gas diffusion layer (GDL) was prepared in the same manner as in Example 1, except that 73.9 g of the carbon black particles having a partially graphitized structure (Preparation Example 1), graphitized at 1,600° C., and 43.5 g (PTFE content 26.1 g) of the PTFE emulsion (PTFE content of 60 wt %) were used as main materials of MPL, and 5 wt % (based on a total weight of MPL solid content) of the cerium oxide particles obtained in Preparation Example 2 (molar ratio of $Ce^{3+}$ ions to $Ce^{4+}$ ions=about 25:about 75), and 10 wt % (based on a total weight of MPL solid content) of the nitrogen-doped carbon particles having a partially graphitized structure obtained in Preparation Example 4 (N doping amount of 1.5 atomic %) were used as radical scavengers in the process (i) of preparing the composition for a microporous layer.

Example 6 (EX 6)

A gas diffusion layer (GDL) was prepared in the same manner as in Example 1, except that 5 wt % (based on a total weight of MPL solid content) of the nitrogen-doped cerium oxide particles obtained in Preparation Example 3 (molar ratio of $Ce^{3+}$ ions to $Ce^{4+}$ ions=about 30:about 70, N doping amount of 7.2 atomic %), and 10 wt % (based on a total weight of MPL solid content) of the nitrogen-doped carbon particles having a partially graphitized structure obtained in Preparation Example 4 (N doping amount of 1.5 atomic %) were used as radical scavengers in the process (i) of preparing the composition for a microporous layer.

Example 7 (EX 7)

A gas diffusion layer (GDL) was prepared in the same manner as in Example 1, except that 72.7 g of the carbon black particles having a partially graphitized structure (Preparation Example 1), graphitized at 1,600° C., and 45.5 g (PTFE content 27.3 g) of the PTFE emulsion (PTFE content of 60 wt %) were used as main materials of MPL; and 5 wt % (based on a total weight of MPL solid content) of the cerium oxide particles obtained in Preparation Example 2 (molar ratio of $Ce^{3+}$ ions to $Ce^{4+}$ ions=about 30:about 70), 5 wt % (based on a total weight of MPL solid content) of the nitrogen-doped cerium oxide particles obtained in Preparation Example 3 (molar ratio of $Ce^{3+}$ ions to $Ce^{4+}$ ions=about 30:about 70, N doping amount of 7.2 atomic %), and 10 wt % (based on total weight of MPL solid content) of the nitrogen-doped carbon particles having a partially graphitized structure obtained in Preparation Example 4 (N doping amount of 1.5 atomic %) were used as radical scavengers in the process (i) of preparing the composition for a microporous layer.

Comparative Example 1 (CEX 1)

A gas diffusion layer (GDL) was prepared in the same manner as in Example 1, except that non-graphitized carbon black (Manufacturer: Cabot Corporation, product name: Vulcan XC-72) was used as a main material of MPL instead of the graphitized carbon black, and a radical scavenger was not used in the process (i) of preparing the composition for a microporous layer.

Comparative Example 2 (CEX 2)

A gas diffusion layer (GDL) was prepared in the same manner as in Example 1, except that a radical scavenger was not used at all in the process (i) of preparing the composition for a microporous layer.

In Table 2 below, in the GDLs obtained in Examples 1 to 7 and Comparative Example 1 and 2, the types and contents of the main materials and radical scavengers in the microporous layer are summarized.

TABLE 2

| | Composition ratio of main materials and radical scavenger additive in MPL | | | | |
|---|---|---|---|---|---|
| | Content of main materials of MPL | | Content of radical scavenger additive (wt % based on a total weight of MPL solid content) | | |
| Classification | Conductive particles | Water-repellent binder resin | Ce oxide particles | Nitrogen-doped Ce oxide particles | Nitrogen-doped and partially graphitized carbon particles |
| EX 1 | Partially graphitized carbon particles 76 g | PTFE 24 g | 5 wt % ($Ce^{3+}/Ce^{4+}$ molar ratio: about 25:about 75) | — | — |
| EX 2 | Partially graphitized carbon particles 76 g | PTFE 24 g | 5 wt % ($Ce^{3+}/Ce^{4+}$ molar ratio: about 30:about 70) | — | — |
| EX 3 | Partially graphitized carbon particles 76 g | PTFE 24 g | — | 5 wt % ($Ce^{3+}/Ce^{4+}$ molar ratio: about 30:about 70, N doping amount: 7.2 atomic %) | — |
| EX 4 | Partially graphitized carbon particles 75 g | PTFE 25 g | — | — | 10 wt % (N doping amount: 1.5 atomic %) |
| EX 5 | Partially graphitized carbon particles 73.9 g | PTFE 26.1 g | 5 wt % ($Ce^{3+}/Ce^{4+}$: about 25:about 75) | — | 10 wt % (N doping amount: 1.5 atomic %) |
| EX 6 | Partially graphitized carbon particles 73.9 g | PTFE 26.1 g | — | 5 wt % ($Ce^{3+}/Ce^{4+}$ molar ratio: about 30:about 70, N doping amount: 7.2 atomic %) | 10 wt % (N doping amount: 1.5 atomic %) |

TABLE 2-continued

Composition ratio of main materials and radical scavenger additive in MPL

| Classification | Content of main materials of MPL | | Content of radical scavenger additive (wt % based on a total weight of MPL solid content) | | |
|---|---|---|---|---|---|
| | Conductive particles | Water-repellent binder resin | Ce oxide particles | Nitrogen-doped Ce oxide particles | Nitrogen-doped and partially graphitized carbon particles |
| EX 7 | Partially graphitized carbon particles 72.7 g | PTFE 27.3 g | 5 wt % ($Ce^{3+}/Ce^{4+}$: about 30:about 70) | 5 wt % ($Ce^{3+}/Ce^{4+}$ molar ratio: about 30:about 70, N doping amount: 7.2 atomic %) | 10 wt % (N doping amount: 1.5 atomic % |
| CEX 1 | Carbon particles that do not have a partially graphitized structure 76 g | PTFE 24 g | — | — | — |
| CEX 2 | Partially graphitized carbon particles 76 g | PTFE 24 g | — | — | — |

Manufacture Example 1: Manufacture of Unit Cell of Fuel Cell

A unit cell of a polymer electrolyte type fuel cell was manufactured using the gas diffusion layer of Example 1 as a cathode gas diffusion layer and an anode gas diffusing layer and using a commercially available membrane electrode assembly (MEA). The commercially available MEA used was purchased from Gore Ltd. under the product name of PRIMEA 5730.

Manufacture Examples 2 to 7: Manufacture of Unit Cells of Fuel Cell

Unit cells of fuel cell were manufactured and operated in the same manner as in Manufacture Example 1, except that each of the gas diffusion layers of Examples 2 to 7 was used instead of the gas diffusion layer of Example 1.

Comparative Manufacture Examples 1 and 2: Manufacture of Unit Cells of Fuel Cell Unit cells of fuel cell were manufactured and operated in the same manner as in Manufacture Example 1, except that each of the gas diffusion layers of Comparative Examples 1 and 2 was used instead of the gas diffusion layer of Example 1.

In Table 3 below, several physical properties of the GDLs obtained in Examples 1 to 7 and Comparative Examples 1 and 2 are summarized.

TABLE 3

Physical properties of gas diffusion layer

| Classification | Electrical resistance, $m\Omega \cdot cm^2$ | Contact angle, ° | Air permeability, $cm^3/cm^2 \cdot s$ |
|---|---|---|---|
| EX 1 | 6.2 | 153.7 | 3.1 |
| EX 2 | 6.3 | 153.8 | 3.2 |
| EX 3 | 6.5 | 154.6 | 2.9 |
| EX 4 | 6.0 | 156.2 | 2.8 |
| EX 5 | 7.0 | 154.2 | 2.7 |
| EX 6 | 7.1 | 153.7 | 3.0 |
| EX 7 | 7.5 | 153.5 | 3.1 |
| CEX 1 | 9.5 | 150.2 | 2.7 |
| CEX 2 | 5.8 | 157.1 | 2.8 |

Referring to Table 3, in Comparative Example 2 in which carbon black carbon particles having a partially graphitized structure are used as a main material of MPL, there is exhibited an effect of reducing electrical resistance by about 40%, as compared with Comparative Example 1 in which general carbon black carbon particles not having a partially graphitized structure are used as a main material of MPL, exhibits. In Examples 1 to 7 in which carbon black carbon particles having a partially graphitized structure are used as a main material of MPL and cerium oxide is added as a radical scavenger, electrical resistance tends to slightly increase as the amount of cerium oxide increased rather than the difference of the type thereof. In Example 4 in which nitrogen-doped carbon particles having a partially graphitized structure are added, an increase in electrical resistance is within the margin of error. That is, it may be found that cerium oxide increases somewhat the electrical resistance of a gas diffusion layer regardless of nitrogen doping, whereas nitrogen-doped carbon particles having a partially graphitized structure do not influence electrical resistance.

In Comparative Example 2 in which carbon particles having a partially graphitized structure are used as a main material of MPL, contact angle increases, and hydrophobic characteristics are exhibited, as compared with Comparative Example 1. When carbon particles having a partially graphitized structure are used as a main material of MPL and cerium oxide particles are added as a radical scavenger, contact angle somewhat decreases due to the influence of cerium oxide, and a microporous layer including a very hydrophobic region and a partially hydrophilic region may be obtained. Thus, it may be found that fuel cell performance can be increased under high and low humidification conditions.

In Examples 1 to 7, contact angle and air permeability exhibit an almost similar level, as compared with Comparative Example 1 and 2 in which a radical scavenger was not added. This means that the addition of a radical scavenger has little effect on the structure of through passages in the microporous layer, which has a great effect on air permeability.

Figure 3:
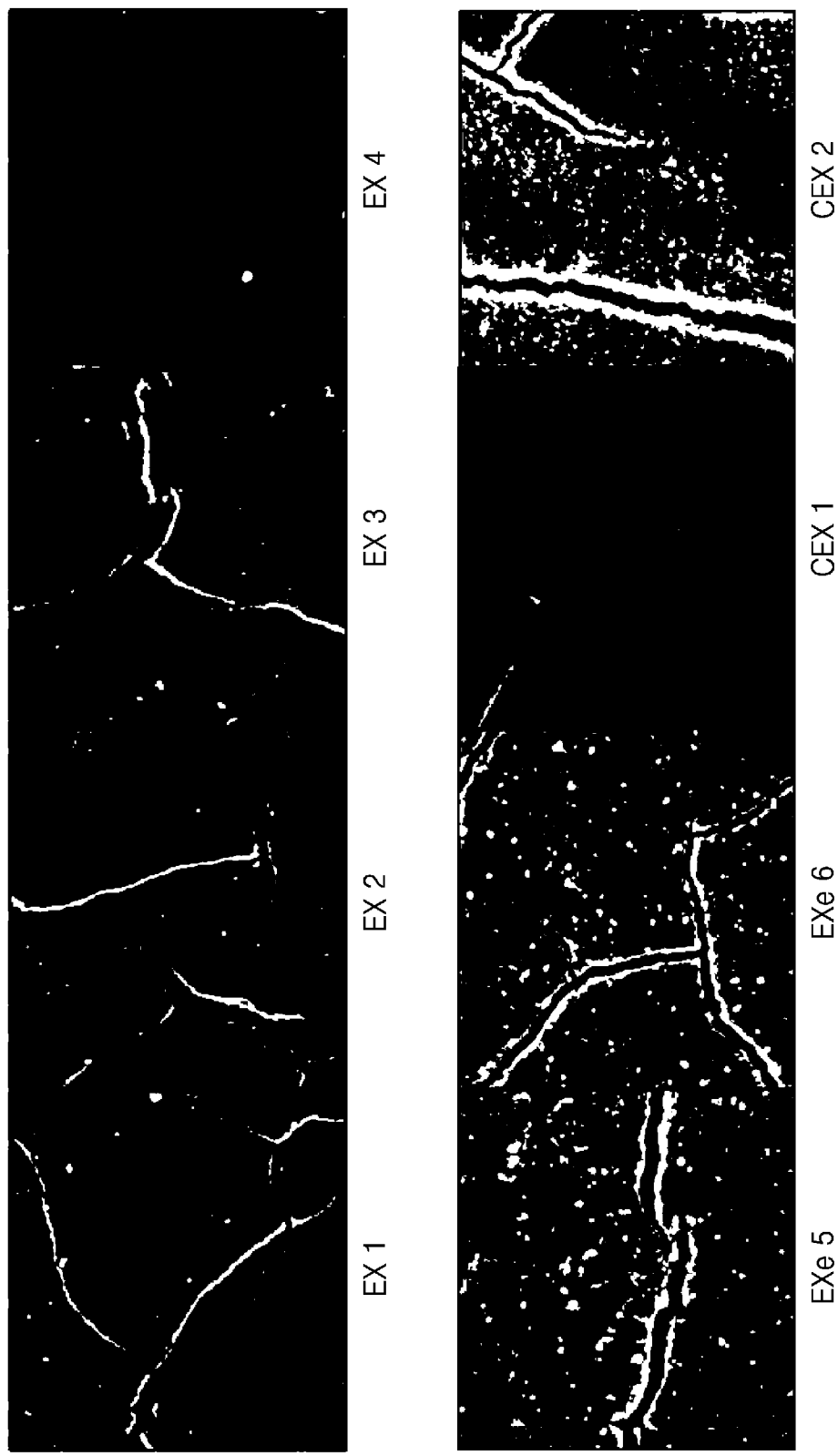
FIG. 3 illustrates scanning electron microscope (SEM) photographs of surface states of microporous layers of gas diffusion layers obtained in Examples 1 to 6 and Comparative Example 1 and 2.

FIG. 3 illustrates scanning electron microscope (SEM) photographs of surface states of microporous layers of gas diffusion layers obtained in Examples 1 to 6 and Comparative Example 1 and 2.

Referring to FIG. 3, the microporous layers have through passages capable of moving gas and water to the carbon substrate, and in Comparative Examples 1 and 2 in which a radical scavenger is not included, the microporous layers have a smooth surface structure. In contrast, in Examples 1 to 6, it may be found that very fine particles are partially aggregated inside the microporous layers and on the surface thereof due to the addition of the radical scavenger particles. That is, it may be found that primary particles of the radical scavenger of several tens of nanometers are aggregated to be increased in size in the manufacturing process. The physical properties given in Tables 2 to 4 were measured by the following methods.

Evaluation Example 1: Measurement of Electrical Resistance

Voltage drops (unit: V) of the gas diffusion layers were each measured by placing four sheets of the gas diffusion layer to be measured between gold-coated Cu plates and flowing a current of 1 A in a thickness direction while applying a pressure of 600 N thereon. Again, a voltage drop using two sheets of gas diffusion layer was measured, and a resistance value (unit: mΩg·cm$^2$) was calculated from a difference between the two resistances.

Evaluation Example 2: Air Permeability

The air permeability of the prepared gas diffusion layer was measured using an air permeability tester (model: FX3300-IV, manufacturer: Textest Instuments, France). In this case, the air permeability (unit: cm$^3$/cm$^2$·s) was based on an amount of air permeating the gas diffusion layer when a pressure difference applied on 38 cm$^2$ of an area of the gas diffusion layer at room temperature (about 20° C.) was 125 Pa.

Evaluation Example 3: Measurement of Contact Angle

Changes in a contact angle value of the gas diffusion layer were measured using a contact angle measurement system (model name: DSA10, manufacturer: KRÜSS GmbH). In this case, 9 μL of distilled water was used in the measurement in a sessile mode at room temperature (about 20° C.).

Figure 2:
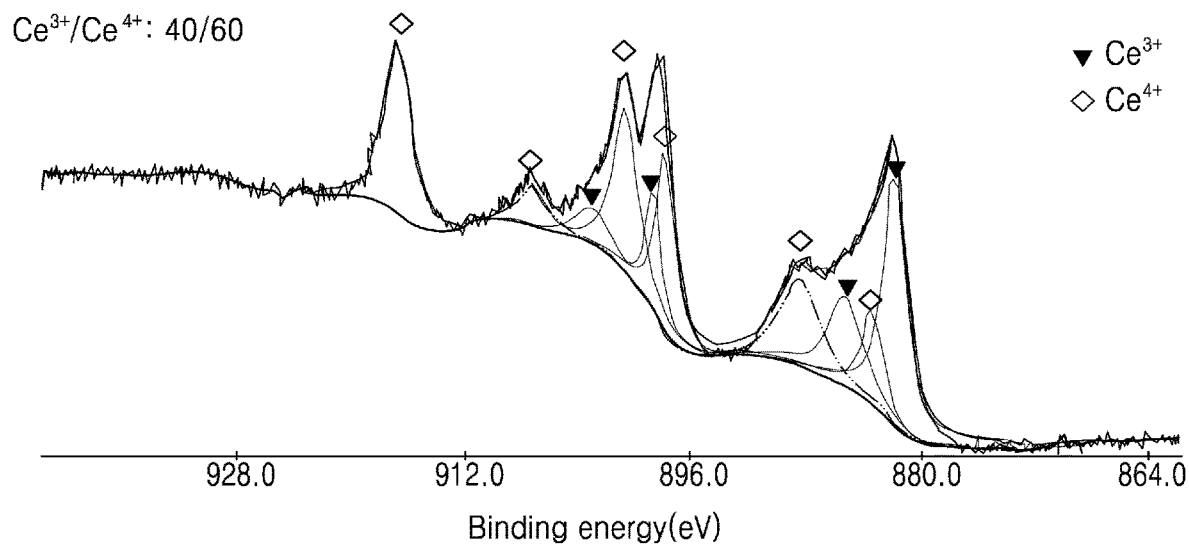
FIG. 2 illustrates X-ray photoelectron spectroscopy spectra of Ce oxide obtained in Preparation Example 2, from which coexistence of $Ce^{3+}$ and $Ce^{4+}$ ions may be observed.
Figure 2:
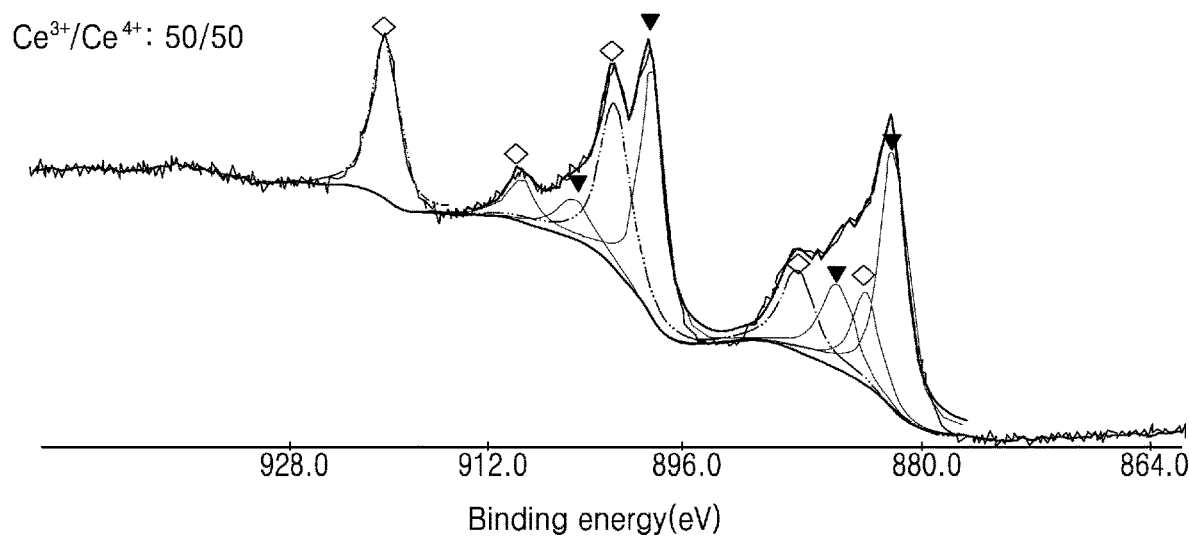

Evaluation Example 4: Measurement of Ion Distribution Ratio of Ce$^{3+}$:Ce$^{4+}$ in Ce Oxide and Nitrogen-Doped Ce Oxide The ion distribution ratio was calculated from the area ratio of binding energy (unit: eV) of characteristic peaks each indicating the state of Ce$^{3+}$ and Ce$^{4+}$ on the X-ray photoelectron spectroscopy spectrum. FIG. 2 illustrates an X-ray photoelectron spectroscopy (XPS) spectrum of Ce oxide obtained in Preparation Example 2. This XPS spectrum was obtained using a scanning X-ray microprobe (model: Ulvac-PHI Quantera-II, manufacturer: ULVAC-PHI Inc.). In this spectrum, the characteristic peaks indicating the state of Ce$^{3+}$ were designated as peaks existing at the positions where binding energy is 882 eV, 885 eV to 886 eV, 898 eV to 898.9 eV, and/or 902.5 eV to 903.5 eV, and the characteristic peaks indicating the state of Ce$^{4+}$ were designated as peaks existing at the positions where binding energy is 883.5 eV to 884 eV, 888.5 eV to 889 eV, 897.6 eV to 897.9 eV, 900.5 eV to 900.7 eV, 907.1 eV to 907.3 eV, and/or 916.4 eV to 916.6 eV.

Evaluation Example 5: Measurement of Nitrogen Doping Amount

Figure 4:
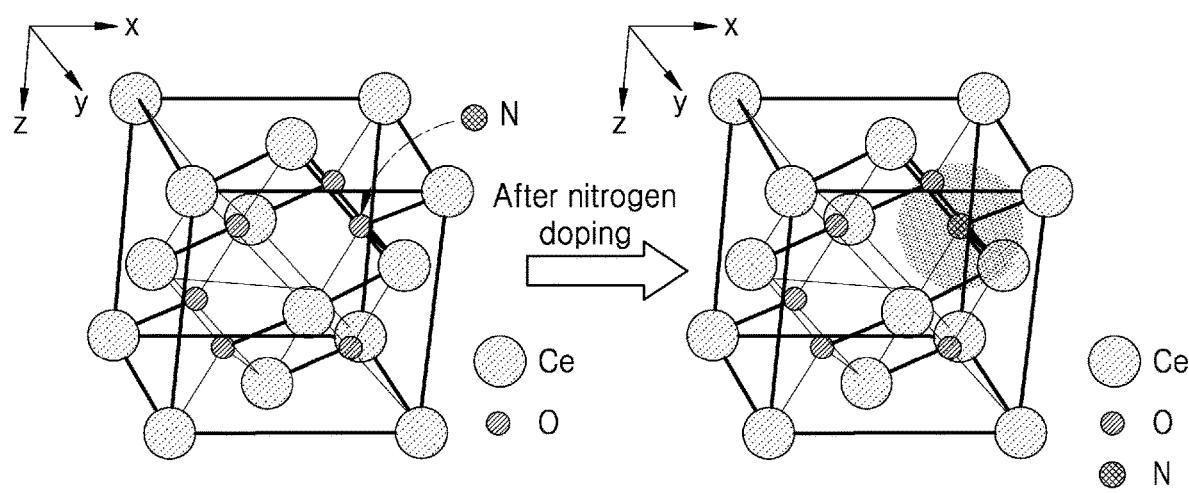
FIG. 4 is a schematic view of Ce oxide doped with nitrogen atoms, which illustrates a state where some of oxygen atom sites are substituted with nitrogen atoms.

FIG. 4 is a schematic view of Ce oxide doped with nitrogen atoms, which illustrates a state in which some of oxygen atom sites are substituted with nitrogen atoms. The doping amount of cerium oxide and the doping amount carbon particles were calculated from the area ratio of Ce—N characteristic peaks existing at the position where binding energy is 397 eV to 398 eV and the area ratio of C—N characteristic peaks existing at the position where binding energy is 397 eV to 407 eV, respectively, on the XPS spectrum.

Table 4 below shows a change in contact angle on the surfaces of the microporous layers obtained in Examples 1 to 7 and Comparative Example 1 and 2 according to a change in immersion time in a 30 wt % aqueous hydrogen peroxide solution.

TABLE 4

| Classification | Contact angle (°) | | | | |
|---|---|---|---|---|---|
| | Initial | 1 hour | 6 hours | 12 hours | 24 hours |
| EX 1 | 153.7 | 151.6 | 148.6 | 147.5 | 146.8 |
| EX 2 | 153.8 | 151.4 | 149.1 | 147.7 | 147.1 |
| EX 3 | 154.6 | 152.9 | 150.9 | 149.8 | 148.4 |
| EX 4 | 156.2 | 153.7 | 152.9 | 151.5 | 150.3 |
| EX 5 | 154.2 | 152.9 | 150.0 | 149.3 | 149.5 |
| EX 6 | 153.7 | 151.2 | 150.2 | 149.5 | 149.3 |
| EX 7 | 153.5 | 151.9 | 150.7 | 150.2 | 149.8 |
| CEX 1 | 150.2 | 146.8 | 145.8 | 145.7 | 140.4 |
| CEX 2 | 157.1 | 153.2 | 152.3 | 150.2 | 146.5 |

From the results of Table 4, it is possible to indirectly evaluate the durability of the microporous layer in the gas diffusion layer according to the types and contents of the main materials and radical scavenger of the microporous layer. Specifically, referring to Tables 4 and 5, in order to evaluate the durability of the gas diffusion layer according to the types and composition ratios of the main materials and radical scavenger of the microporous layer, the gas diffusion layer was immersed into a 30% hydrogen peroxide solution at 80° C. by an ex-situ method, and the contact angle in the microporous layer over time was measured to confirm a difference in hydrophobicity. In the gas diffusion layer, as carbon components of the microporous layer are oxidized by the action of hydrogen peroxide, hydrophilicity may increase, and thus contact angle may decrease. In Comparative 2 and Examples 1 to 7 in which carbon black having a partially graphitized structure was used as a main material of the microporous layer, initial contact angle increased, as compared with Comparative Example 1. However, in Comparative Example in which a radical scavenger is not included, the contact angle greatly decreases over time, whereas, in Comparative Example 2, the initial contact angle is high and the reduction rate thereof is gentle as compared to Comparative Example 1. Further, in Examples 1 to 7, the change in contact angle is gentle, and a contact angle of 146° to 150° was maintained over 24 hours. Thus, it may be found that the change in contact angle is small because the radical scavenger protects the microporous layer from the oxidation of hydrogen peroxide, and particularly, effects of improving stability and durability are largest in the case of adding the nitrogen-doped Ce compound and the carbon particles having a partially graphitized structure.

Figure 5:
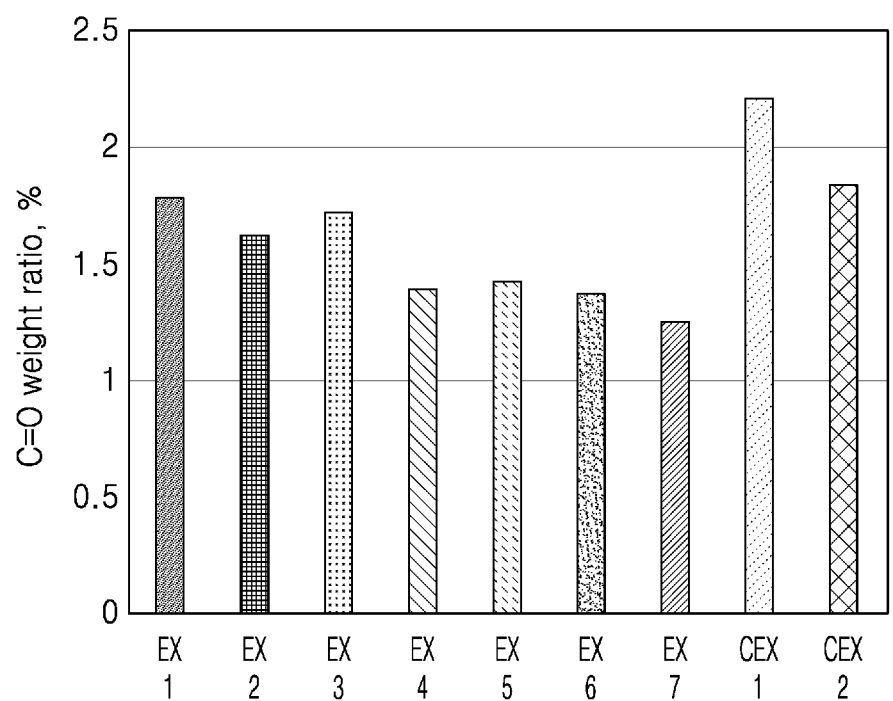
FIG. 5 illustrates the results of comparing C=O weight ratios obtained by the XPS analysis of the surfaces of the microporous layers obtained in Examples 1 to 7 and Comparative Examples 1 and 2 in which these microporous layers were immersed in a 30 wt % hydrogen peroxide aqueous solution at 80° C. for 24 hours.

FIG. 5 illustrates the results of comparing C=O weight ratios obtained by the XPS analysis of the surfaces of the microporous layers obtained in Examples 1 to 7 and Comparative Examples 1 and 2 in which these microporous layers were immersed into a 30 wt % hydrogen peroxide aqueous solution at 80° C. for 24 hours.

When carbon is corroded by hydrogen peroxide or an electrochemical reaction, a C=O functional group is generated on the carbon surface, and degree of carbon corrosion may be predicted by quantitatively analyzing the amount of the C=O functional group. Referring to FIG. 5, the content of initial carbonyl C=O weight ratio of each of the gas diffusion layers of Comparative Examples 1 and 2, in which a radical scavenger was not added, was 0.52%, but was greatly increased to 2.21% as carbon components of the microporous layer of Comparative Example 1, in which a radical scavenger was not included, were oxidized due to the oxidation action of hydrogen peroxide after the immersion of the gas diffusion layer for 24 hours. However, in Comparative Example 2 in which carbon particles having a partially graphitized structure were used as a main material of the microporous layer, the content of C=O was about 1.8%, which was lowered compared to Comparative Example 1, but it indicates that the carbon particles were partially corroded. In Examples 1 to 7 in which cerium oxide particles and/or nitrogen-doped carbon particles having a partially graphitized structure were added as a radical scavenger, an increase in the content of C=O was much smaller than that in Comparative Examples 1 and 2 in which a radical scavenger was not included. In particular, when the distribution ratio of $Ce^{3+}/Ce^{4+}$ ions in the cerium oxide was about 30:70, corrosion resistance was more excellent, compared to when the distribution ratio thereof was about 25:75. In the case of the nitrogen-doped cerium oxide, a result of improved corrosion resistance was obtained as well. In particular, when the nitrogen-doped carbon particles having a partially graphitized structure were added, an increase in the content of C=O was very small. When doped with nitrogen, similar corrosion resistance characteristics were exhibited regardless of the kind of cerium oxide. From the result, it may be found that the effect of Ce oxide as a radical scavenger is good, but the effect of improving stability and durability by nitrogen-doped Ce oxide and, particularly, nitrogen-doped carbon particles having a partially graphitized structure is much greater. The change in C=O weight ratio in FIG. 5 was evaluated by measuring the C=O weight ratio as follows.

Evaluation Example 6: Measurement of C=O Weight Ratio on Surface of MPL

The C=O weight ratio on the surface of MPL was measured using X-ray photoelectron spectroscopy (XPS). Specifically, an XPS spectrum was obtained using a scanning X-ray microprobe (model: Ulvac-PHI Quantera-II, manufacturer: ULVAC-PHI Inc.). In the spectrum, an area of the characteristic peaks of carbonyl group was measured in the range of binding energy of 532 eV to 533.5 eV, and the weight ratio of carbonyl group on the surface of the uppermost layer of MPL was calculated from the measured area of the characteristic peaks.

Figure 6:
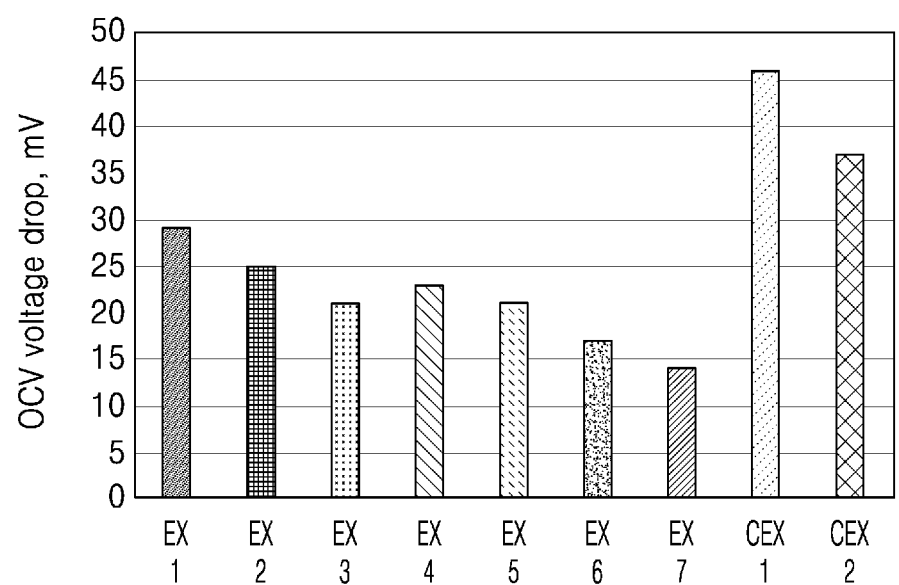
FIG. 6 illustrates a decrease in an open circuit voltage measured after performing an acceleration test by applying a voltage of 1.4 V to the unit cells of fuel cells including the microporous layers obtained in Examples 1 to 7 and Comparative Examples 1 and 2 for 120 hours under an oxygen deficient state.

FIG. 6 illustrates a decrease in an open circuit voltage (OCV) measured after performing an acceleration test by applying a voltage of 1.4 V to the unit cells of fuel cells including the microporous layers obtained in Examples 1 to 7 and Comparative Examples 1 and 2 for 120 hours under an oxygen deficient state.

Referring to FIG. 6, in Examples 1 to 7 in which carbon particles having a partially graphitized structure was used as a main material of the microporous layer and a radical scavenger was used, particularly, in Examples 3 to 7 in which nitrogen-doped cerium oxide particles and/or nitrogen-doped carbon particle having a partially graphitized structure were included as a radical scavenger, a decrease in OCV was much smaller than that in Comparative Examples 1 and 2 in which a radical scavenger was not included. In particular, when the radical scavenger was doped with nitrogen, a decrease in OCV was smallest. Thus, it may be found that a radical scavenger, particularly, a nitrogen-doped radical scavenger suppresses the formation of radicals or removes the formed radicals, so not only a phenomenon that cell performance deteriorates significantly decreases, but also initial OCV decreases. From this, it may found again that the stability and durability improvement effect by N-doped Ce oxide and carbon particles having a partially graphitized structure were greater than that by Ce oxide, as a radical scavenger. The decrease in open circuit voltage (OCV) shown in FIG. 6 was measured according to the following method.

Evaluation Example 7: Evaluation of Decrease in Open Circuit Voltage (OCV)

During start-up and shutdown of a fuel cell, an electrochemical reaction due to oxygen remaining in an air electrode (cathode) of the fuel cell may occur, resulting in an increase in voltage. Accordingly, corrosion of carbon supports of catalyst particles in a fuel cell stack may occur, and thus the durability of the fuel cell stack may deteriorate.

In order to confirm whether the durability of the gas diffusion layer including the radical scavenger and the nitrogen-doped radical scavenger is improved, while the temperature of each of the fuel cell unit cells prepared in Manufacture Examples 1 to 7 and Comparative Manufacture Examples 1 and 2 was maintained at 80° C., and 200 mL/min of hydrogen and 200 mL/min of nitrogen were supplied to a hydrogen electrode (anode) and an air electrode (cathode), respectively, an acceleration test in which 1.4V is applied to each of the unit cells for 120 hours in a state of oxygen deficiency was conducted.

Figure 7:
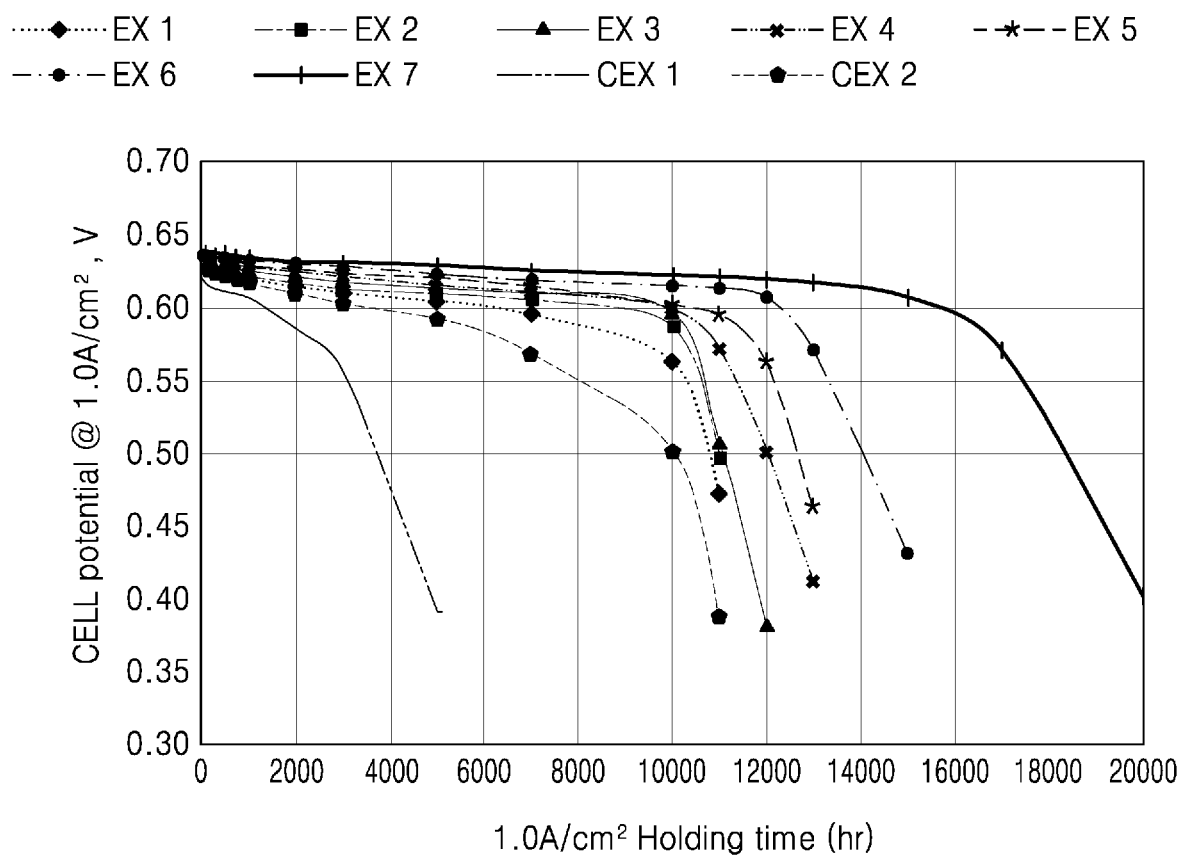
FIG. 7 illustrates a change in cell voltage of the unit cells of fuel cells including the microporous layers obtained in Examples 1 to 7 and Comparative Examples 1 and 2 with respect to holding time (hr) at a constant current density of 1.2 $A/cm^2$.

FIG. 7 illustrates a change in cell voltage of the unit cells of fuel cells including the microporous layers obtained in Examples 1 to 7 and Comparative Examples 1 and 2 with respect to holding time (hr) at a constant current density of 1.2 A/cm². Referring to FIG. 7, in Comparative Example 1 in which Ce oxide is not included, the initial voltage at an output density of 1.2 A/cm² was 0.62 V, and a voltage drop rapidly occurred over 1,000 hours. In contrast, in Comparative Example 1 in which carbon black having a partially graphitized structure is used, the voltage drop was 0.59 V over 5,000 hours, from which it may be found that the voltage drop occurs at a much slower speed.

In Examples 1 to 7, when the Ce ion molar ratio ($Ce^{3+}/Ce^{4+}$) of cerium oxide is about 30/70 (Example 2), more stable voltage characteristics were exhibited compared to when the Ce ion molar ratio thereof is about 25/75 (Example 1). In particular, in Example 3 in which nitrogen-doped cerium oxide is used, the voltage characteristics were more stable, and were similar to those of Example 4 in which nitrogen-doped carbon particles having a partially graphitized structure are used as a radical scavenger. Cell potentials of 0.6 V or more may be obtained at about 10,000 hours or more just by using a radical scavenger. In particular, when Ce oxide and nitrogen-doped carbon particles having a partially graphitized structure are used together as a radical scavenger, the durability of the fuel cell was significantly improved. The reason for this may be interpreted as follows: before side products produced from side reactions, such as deterioration of a polymer membrane, deterioration of a catalyst layer, and corrosion of carbon in the microporous layer deteriorate an MEA and a gas diffusion layer, the radical scavenger decomposes the side products, thereby suppressing the deterioration of the fuel cell. That is, it has been verified that the durability of the fuel cell can be significantly improved and the lifespan of the fuel cell can be increased simply by putting the radical scavenger into the microporous layer without putting the radical scavenger into the polymer membrane or catalyst layer.

The electrochemical performance of the unit cells shown in FIG. 7 was measured according to the following method.

Evaluation Example 8: Evaluation of Electrochemical Performance of Unit Cell

In order to evaluate the durability of a gas diffusion layer, hydrogen was supplied to an anode of each of the fuel cell unit cells manufactured in Manufacture Examples 1 to 7 and Comparative Manufacture Examples 1 and 2, and air was supplied to a cathode thereof, and a change in cell potential (unit: voltage) at a current density of 1.0 $A/cm^2$ with respect to holding time was measured. The operating conditions of the unit cell were as follows.

Cell temperature: 80° C.; Relative Humidity (RH): 30%
Stoichiometric ratio of hydrogen/oxygen supplied (1.5/2.0, Current density: 1.0 $A/cm^2$.

As described above, in the gas diffusion layer according to the present disclosure, the microporous layer may use carbon particles having a partially graphitized structure as a main material and further use cerium oxide, nitrogen-doped cerium oxide, nitrogen-doped carbon particles having a partially graphitized structure, and/or nitrogen-doped second carbon particles having a non-graphitized structure, as a radical scavenger, thereby greatly improving the durability of a fuel cell.

In the gas diffusion layer according to the present disclosure, the microporous layer includes first carbon particles having a partially graphitized structure as a main material, and further includes a cerium compound, particularly, cerium oxide, a nitrogen-doped cerium compound, nitrogen-doped second carbon particles having a partially graphitized structure, nitrogen-doped second carbon particles having a non-graphitized structure, or a mixture of two or more thereof as a radical scavenger capable of effectively removing hydrogen peroxide. A radical scavenger, particularly, porous Ce oxide in which the ion molar ratio of $Ce^{3+}:Ce^{4+}$ is adjusted in a range of 0.2:0.8 to 0.5:0.5, preferably, 0.25:0.75 to 0.5:0.5, 0.3:0.7 to 0.5:0.5, particularly, porous Ce oxide in which the ion molar ratio of $Ce^{3+}:Ce^{4+}$ is adjusted in the above range and which is doped with nitrogen, for example, porous Ce oxide in which Ce oxide is doped with nitrogen, nitrogen-doped second carbon particles having a partially graphitized structure, and/or nitrogen-doped second carbon particles having a non-graphitized structure may effectively remove oxygen and hydrogen radicals generated by the operation of the fuel cell and hydrogen peroxide generated by the recombination reaction of these radicals. Due to their high crystallinity of the first carbon particles having a partially graphitized structure used as the main material of the microporous layer, corrosion of carbon support, occurring in the catalyst layer, may be effectively suppressed, and additionally, the electrochemical corrosion of the microporous layer may be effectively suppressed, so that the durability of the MEA and the gas diffusion layer may be improved. In particular, the function of the radical scavenger may be further improved due to the presence of the first carbon particles having a partially graphitized structure as the main material of the microporous layer.

Accordingly, in the membrane electrode assembly and the fuel cell each employing the gas diffusion layer having excellent durability according to one or more embodiments, chemical or electrochemical degradation may be effectively prevented over a long period of time, and thus excellent electrochemical performance may be obtained over a long period of time. This leads to an extended lifetime of the fuel cell.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A gas diffusion layer for fuel cells, the gas diffusion layer comprising:
   a carbon substrate; and a microporous layer formed on the carbon substrate,
   wherein the microporous layer comprises first carbon particles having a partially graphitized structure and a water-repellent binder resin binding the first carbon particles, and the microporous layer further comprises a cerium compound, a nitrogen-doped cerium compound, nitrogen-doped second carbon particles having a partially graphitized or non-graphite structure, or a mixture of two or more, as a radical scavenger capable of removing hydrogen peroxide generated at a fuel cell open circuit potential or a higher potential.

2. The gas diffusion layer of claim 1, wherein the microporous layer comprises 15 wt % to 45 wt % of the water-repellent binder resin and 55 wt % to 85 wt % of the first carbon particles having a partially graphitized structure, and
   the content of the radical scavenger in the microporous layer is 2 wt % to 30 wt % based on a total weight of the microporous layer.

3. The gas diffusion layer of claim 1, wherein the cerium compound comprises nano-sized Ce oxide particles, and/or the nitrogen-doped cerium compound comprises nano-sized nitrogen-doped Ce oxide particles, and in the second carbon particles, a carbon atom in the graphene structure of a second carbon particle is bonded to a nitrogen-containing functional group.

4. The gas diffusion layer of claim 3, wherein the Ce oxide particles and/or the nitrogen-doped Ce oxide particles comprise both $Ce^{3+}$ ions and $Ce^{4+}$ ions.

5. The gas diffusion layer of claim 4, wherein a molar ratio of $Ce^{3+}$ ions to $Ce^{4+}$ ions in the Ce oxide particles and/or the nitrogen-doped Ce oxide particles is in a range of 0.2:0.8 to 0.5:0.5, and in this case, the molar ratio is calculated from an area ratio of characteristic peaks appearing in binding energy (unit: eV) each representing the state of $Ce^{3+}$ and $Ce^{4+}$ in an X-ray photoelectron spectroscopy spectrum.

6. The gas diffusion layer of claim 3, wherein the Ce oxide particles and/or the nitrogen-doped Ce oxide particles have an average size of 20 nm to 70 nm and an average specific area of 20 $m^2/g$ to 220 $m^2/g$.

7. The gas diffusion layer of claim 1, wherein, in the partially graphitized structure, Bragg diffraction angle (2θ) of a carbon particle is 25.2° to 26.4°, an interplanar distance $d_{002}$ of a (002) crystal plane is less than 3.55 Å, and a thickness Lc of the (002) crystal plane is 15 Å to 200 Å.

8. The gas diffusion layer of claim 3, wherein the nitrogen-doped Ce oxide particles include a Ce—N bond in the form of an oxygen site of the Ce oxide being substituted with a nitrogen atom, and have a nitrogen doping amount of 2 atomic % to 15 atomic %.

9. The gas diffusion layer of claim 1, wherein the second carbon particles have a nitrogen doping amount of 0.5 atomic % to 5 atomic %.

10. The gas diffusion layer of claim 1, wherein the water-repellent binder resin is a fluorinated resin.

11. The gas diffusion layer of claim 1, wherein the first and second carbon particles include any one selected from carbon black, active carbon, acetylene black, ketjen black, denka black, carbon whiskers, active carbon fibers, vapor grown carbon fibers (VGCFs), carbon aerosol, carbon nanotubes, carbon nanofibers, carbon nanohorns, or a combination of two or more thereof, and are partially graphitized carbon particles.

12. A membrane electrode assembly for fuel cells, comprising a gas diffusion layer, wherein the gas diffusion layer comprises:
a carbon substrate; and a microporous layer formed on the carbon substrate,
wherein the microporous layer comprises first carbon particles having a partially graphitized structure and a water-repellent binder resin binding the first carbon particles, and the microporous layer further comprises a cerium compound, a nitrogen-doped cerium compound, nitrogen-doped second carbon particles having a partially graphitized or non-graphite structure, or a mixture of two or more, as a radical scavenger capable of removing hydrogen peroxide generated at a fuel cell open circuit potential or a higher potential.

13. The membrane electrode assembly of claim 12, wherein the microporous layer comprises 15 wt % to 45 wt % of the water-repellent binder resin and 55 wt % to 85 wt % of the first carbon particles having a partially graphitized structure, and
the content of the radical scavenger in the microporous layer is 2 wt % to 30 wt % based on a total weight of the microporous layer.

14. The membrane electrode assembly of claim 12, wherein the cerium compound comprises nano-sized Ce oxide particles, and/or the nitrogen-doped cerium compound comprises nano-sized nitrogen-doped Ce oxide particles, and in the second carbon particles, a carbon atom in the graphene structure of a second carbon particle is bonded to a nitrogen-containing functional group.

15. The membrane electrode assembly of claim 14, wherein the Ce oxide particles and/or the nitrogen-doped Ce oxide particles comprise both $Ce^{3+}$ ions and $Ce^{4+}$ ions.

16. The membrane electrode assembly of claim 15, wherein a molar ratio of $Ce^{3+}$ ions to $Ce^{4+}$ ions in the Ce oxide particles and/or the nitrogen-doped Ce oxide particles is in a range of 0.2:0.8 to 0.5:0.5, and in this case, the molar ratio is calculated from an area ratio of characteristic peaks appearing in binding energy (unit: eV) each representing the state of $Ce^{3+}$ and $Ce^{4+}$ in an X-ray photoelectron spectroscopy spectrum.

17. The membrane electrode assembly of claim 14, wherein the Ce oxide particles and/or the nitrogen-doped Ce oxide particles have an average size of 20 nm to 70 nm and an average specific area of 20 $m^2/g$ to 220 $m^2/g$.

18. The membrane electrode assembly of claim 12, wherein, in the partially graphitized structure, Bragg diffraction angle (2θ) of a carbon particle is 25.2° to 26.4°, an interplanar distance $d_{002}$ of a (002) crystal plane is less than 3.55 Å, and a thickness Lc of the (002) crystal plane is 15 Å to 200 Å.

19. The membrane electrode assembly of claim 14, wherein the nitrogen-doped Ce oxide particles include a Ce—N bond in the form of an oxygen site of the Ce oxide being substituted with a nitrogen atom, and have a nitrogen doping amount of 2 atomic % to 15 atomic %.

20. A fuel cell comprising the membrane electrode assembly of claim 12.

* * * * *